United States Patent
Norris et al.

(10) Patent No.: US 6,778,744 B2
(45) Date of Patent: Aug. 17, 2004

(54) DIELECTRIC OPTICAL FIBER CABLE HAVING REDUCED PREFERENTIAL BENDING

(75) Inventors: Richard Hartford Norris, Powder Springs, GA (US); Richard D. Small, Lilburn, GA (US); Phillip Maurice Thomas, Suwanee, GA (US); Peter A. Weimann, Atlanta, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/255,852

(22) Filed: Sep. 25, 2002

(65) Prior Publication Data

US 2003/0044139 A1 Mar. 6, 2003

Related U.S. Application Data

(63) Continuation-in-part of application No. 09/415,881, filed on Oct. 8, 1999, now Pat. No. 6,611,646.

(51) Int. Cl.$^7$ .................................................. G02B 6/44
(52) U.S. Cl. .......................... 385/113; 385/111; 385/112
(58) Field of Search .................. 385/109–114, 100–108

(56) References Cited

U.S. PATENT DOCUMENTS

| | | | |
|---|---|---|---|
| 4,743,085 A | 5/1988 | Jenkins | |
| 4,844,575 A | 7/1989 | Kinard | |
| 4,909,592 A | 3/1990 | Arroyo et al. | |
| 5,109,457 A | 4/1992 | Panuska | |
| 5,125,063 A | 6/1992 | Panuska | |
| 5,555,335 A | 9/1996 | Barker | |
| 5,557,703 A | 9/1996 | Barker | |
| 5,838,864 A | 11/1998 | Patel | |
| 6,259,844 B1 * | 7/2001 | Logan et al. | 385/113 |

FOREIGN PATENT DOCUMENTS

EP           0422764 A        4/1991

* cited by examiner

*Primary Examiner*—Frank G. Font
*Assistant Examiner*—Michael P. Mooney

(57) ABSTRACT

An optical cable (10) includes one or more tubes (120), each containing a number of optical fibers (101), and a plastic jacket (160) that encloses the tube(s). A pair of diametrically opposed rods (300-1, 300-2) are at least partially embedded in the polyethylene jacket and are made from continuous-filament glass fibers that are embedded in epoxy. Each rod has a compressive stiffness that is effective to inhibit substantial contraction of the cable, and a tensile stiffness that is effective to receive tensile loads without substantial transfer of such loads to the glass fibers. Each dielectric rod includes a thin layer (330) of a frictional adhesion coating that provides a controlled adhesion between the rod and the jacket of between 50 and 300 lb./in$^2$. Whereas dual-rod cable designs have a preferred bending plane that passes through the rods, controlled adhesion between the rods and the jacket enables the cable to be easily bent in other planes and to be blown through ducts having multiple corners.

17 Claims, 3 Drawing Sheets

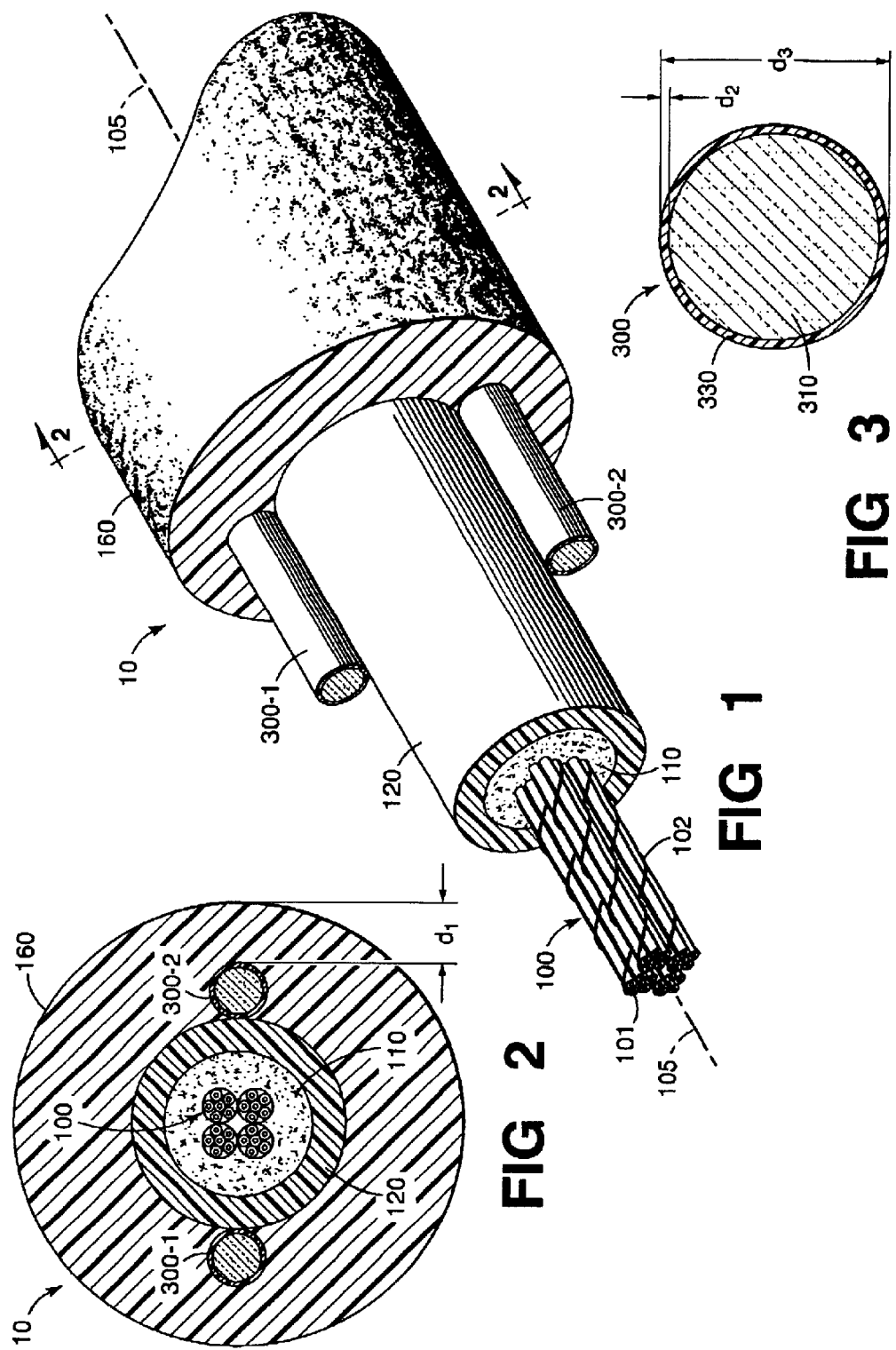

DIELECTRIC OPTICAL FIBER CABLE HAVING REDUCED PREFERENTIAL BENDING

CROSS-REFERENCE TO RELATED APPLICATION

This application is a continuation-in-part of U.S. application Ser. No. 09/415,881 entitled "Hybrid Strength Member For An Optical Cable," which was filed on Oct. 8, 1999, now U.S. Pat. No. 6,611,646 and is hereby incorporated by reference.

TECHNICAL FIELD

This invention relates to optical cables and, more particularly, to the design of a dielectric strength member system.

BACKGROUND OF THE INVENTION

Optical fibers are in widespread use today as transmission media because of their large bandwidth capabilities and small size. However, optical fibers are mechanically fragile, exhibiting low strain fracture under tensile loading and degraded light transmission when bent. Transmission degradation, which results from bending, generally takes the form of macrobending and/or microbending loss. Consequently, cable structures have been developed to protect the optical fibers in various situations. Additionally, optical cables use glass fibers as a communications medium rather than copper wires; and while glass fibers are relatively strong, care must be taken to avoid excessive tensile stress because they are quite thin and are not ductile. Moreover, the optical transmission characteristics (e.g., index of refraction) of glass change in response to the application of stress. Therefore, strength members are generally included in optical cables to receive most or all of the stress due to tensile loading before it can be transferred to the optical fibers.

An optical cable having excellent strength performance is described in U.S. Pat. No. 4,844,575 that issued to Kinard et al. on Jul. 4, 1989. This cable comprises one or more optical fibers that are disposed within a cylindrical plastic tube, and a pair of metallic rods that are positioned on diametrically opposite sides of the tube and extend along the length of the cable. Steel is a preferred strength member for an optical cable because its tensile stiffness is suitable for receiving axial loading and its compressive stiffness is suitable for inhibiting contraction of the cable. Moreover, the cross-section area of a steel strength member is relatively small in comparison with other materials so that it does not undesirably increase the overall diameter of the optical cable. Nevertheless, there has been a long felt need for an all-dielectric cable construction. Such a cable could be strung from building ducts to service distribution points, and would obviate the need for grounding connections at splice points that add to the cost of cable installations. Further, such a dielectric cable would decrease the probability of lightning strikes.

A dielectric optical cable having excellent strength performance is disclosed in U.S. Pat. No. 5,109,457 that issued to Panuska et al. on Apr. 28, 1992. In this patent, the metallic rods of the Kinard et al. patent are replaced with non-metallic rods for tensile and compressive stiffness, and non-metallic rovings for added tensile stiffness. The rods are made from E-glass fiber filaments that have been impregnated with epoxy, and the rovings are made from E-glass fiber filaments without epoxy. FIGS. 5 and 6, herein, show this all-dielectric optical cable in greater detail. The combination of rods and rovings provides excellent strength and flexibility in a relatively small-diameter cable; however, it is desirable to minimize the number of components in a strength member system to simplify its manufacture. However, increasing the diameter of the pair of rods to eliminate the rovings increases the overall diameter of the cable. Nevertheless, for ease of access to the optical fibers within the cable, it is still more desirable to use a pair of diametrically opposed strength rods rather than a larger number of smaller rods that are disposed around the circumference of the cable.

In addition to a smaller diameter cable, it is also desirable to provide one that is capable of being blown through an empty duct within another cable that is already installed in the ground. Such optical fiber cables should be sufficiently flexible to facilitate passage through the empty duct during blowing. Unfortunately, optical cables having diametrically opposed rods exhibit preferential bending in that they bend readily in the plane that passes through the rods, but do not bend readily in an orthogonal plane. Such preferential bending is undesirable during blown cable applications.

Accordingly, what is needed is a dielectric optical cable whose strength system includes diametrically opposed rods, but nevertheless exhibits reduced preferential bending. Additionally, it is desirable that the cable have a reduced outer diameter, suitable flexibility and equivalent tensile strength in comparison with similarly designed optical cables.

SUMMARY OF THE INVENTION

An optical fiber cable according to the present invention includes a core tube containing optical fibers, a plastic jacket that surrounds the core tube, and a pair of linearly extending, diametrically opposed dielectric rods that are at least partially embedded in the jacket. The rods have a compressive stiffness that is effective to inhibit substantial contraction of the cable and a tensile stiffness that is effective to receive a tensile load without substantial transfer of the tensile load to the optical fibers. Each rod is surrounded by a frictional adhesion coating that enables it to move locally within the jacket in response to compressive or flexural stress applied to the cable.

In a preferred embodiment of the invention, the use of aramid fibers is completely avoided within the optical cable, and each dielectric rod comprises packages of glass fibers that are embedded in epoxy. The frictional adhesion coating is selected to be relatively soft (i.e., a hardness that is less than 80 D on the Shore durometer scale), which provides a high coefficient of friction with the jacket. Advantageously, when such frictional adhesion materials are used, flexibility is increased and the thickness of the jacket adjacent to the rods can be as small as 0.76±13 mm. (i.e., 30±5 mils) without fear that the cable will split when subjected to local twisting.

BRIEF DESCRIPTION OF THE DRAWING

The invention and its mode of operation will be more clearly understood from the following detailed description when read with the appended drawing in which:

FIG. 1 is a perspective view of an optical cable having an improved strength system in accordance with the invention;

FIG. 2 is a cross-section view of the cable of FIG. 1, illustrating certain elements of the cable in detail;

FIG. 3 is a cross-section view of a dielectric strength member for use in an optical cable according to the present invention;

DETAILED DESCRIPTION

Figure 4:
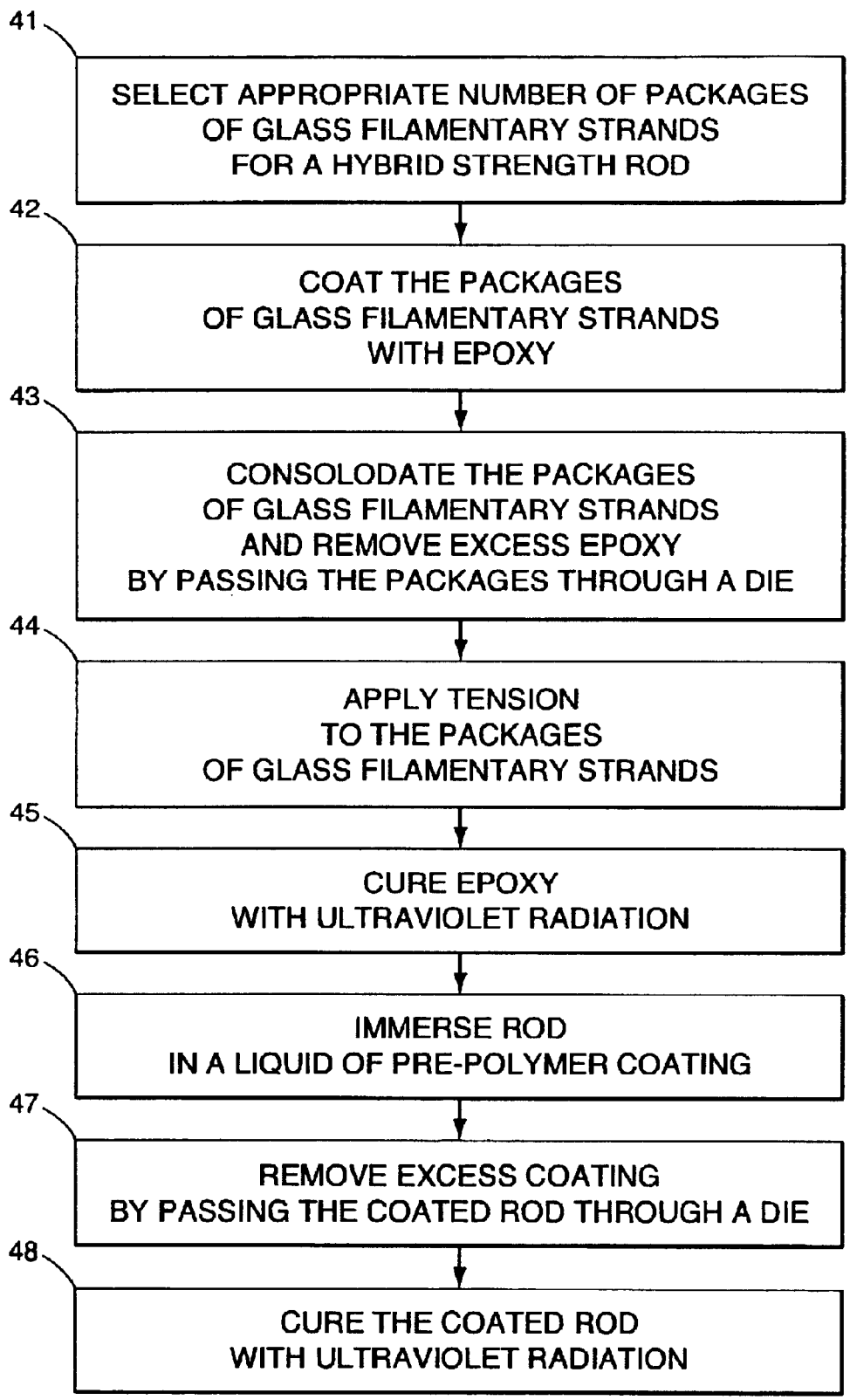
FIG. 4 is a flow-diagram of a method for making a strength member for an optical cable according to the invention.

Reference is made to FIGS. 1 and 2, which show an optical-fiber cable designated generally by the numeral 10. The cable 10 has a core that includes one or more optical fibers 101, which are disposed within a core tube 120 that extends along a longitudinal axis 105—105 of the cable. In a preferred embodiment, a bundle 100 of optical fibers is held together with a binder 102 that is helically wrapped around them. Alternatively, one or more linear arrays of fibers, in the form of ribbons, can be stacked together. Core tube 120 is, illustratively, made of a plastic material such as high-density polyethylene (HDPE), polypropylene, polyvinyl chloride (PVC), polybutylene terephthlate (PBT), or nylon.

The cable of the present invention may include a water-blocking provision, such as filling material 110, which is disposed within the core tube 120 and fills interstices among the bundles 100 and among the fibers 101 within each bundle. Preferably, dry superabsorbent waterswellable materials of the kind disclosed in U.S. Pat. No. 4,909,592 are used in the present invention.

A pair of rigid strength rods 300-1, 300-2 are positioned on diametrically opposite sides of the core tube 120 to impart compressive and tensile properties to the cable as discussed below. A plastic jacket 160, preferably made of high-density polyethylene, is extruded onto the above-described cable components to provide additional strength and protection from the environment. The strength rods 300-1 and 300-2 are at least partially embedded in the jacket 160 so that compressive and tensile loads that are applied to the jacket will be directly coupled to the strength rods. Advantageously, the strength rods are coated with a frictional adhesion material to control the coupling between the rods and the jacket so as to permit axial movement of the rods when localized bending is applied to the cable. Localized bending contemplates a bending radius of between 12 and 36 inches. Heretofore, optical cables having a pair of diametrically opposed strength rods, without the frictional adhesion coating of the present invention, had more than four (4) times the bending resistance between orthogonal bending planes (i.e., 1543 versus 356 lbs·in$^2$); whereas with the present invention, the bending resistance between orthogonal bending planes only differs by a factor of 1.2 (i.e., 446 versus 363 lbs·in$^2$). It is noted that the orthogonal bending planes intersect along the longitudinal axis 105 of the cable 10, and that one of the orthogonal bending planes cuts through both rods.

Local axial movement of the dielectric rods allows the cable to undergo localized twisting without splitting the jacket 160. As shown in FIG. 2, the cable jacket thickness, $d_1$, adjacent to the strength rods, can be about 0.76 mm (i.e., 0.30 inches), which is relatively thin. Preferably, $d_1$ is 0.76±13 mm. (i.e., 0.030±0.005 inches). Without the present invention, $d_1$ for a comparable cable needs to be about 40% thicker (i.e., 0.045±0.005 inches).

Reference is further made to FIG. 1 with regard to the texturing shown on the outside surface of the cable jacket 160. Texturing broadly includes: longitudinal grooves; materials that provide increased roughness; and patterns or debris impressed onto the jacket surface. Texturing is designed to increase the outside surface area of the cable and enhance its ability to be blown by compressed air through an empty duct in an existing cable.

Strength System

Ideally, a strength system should only include strong, flexible strands for handling tensile loads. (Optical glass fibers may rival the strength of steel for a given cross-section area, but they have very small cross sections and are not ductile.) Accordingly, filamentary strands of a material having high tensile strength would seem to provide the ideal strength system for an optical cable since they provide the most-flexible and smallest-diameter cable. However, flexible strength members with high tensile strength are inadequate to resist shrinkage of the plastic jacket 160 after extrusion onto the cable 10, and the strength system may need compressive strength also. Accordingly, the strength system of the present invention includes one or more rod-like strength members 300-1, 300-2 to protect the optical fibers 101 within the core tube 120 not only from excessive tensile loading during handling and service (e.g., aerial applications), but also from compressive loading when the plastic jacket 160 shrinks during thermal cycling, particularly after extrusion onto the cable components. Moreover, compressive strength may be needed to prevent the cable from buckling during installation and handling.

A pair of dielectric strength rods 300-1 and 300-2 having suitable tensile and compressive strength are symmetrically positioned on opposite sides of the core tube 120 and, preferably, extend linearly and parallel to the longitudinal axis 105 of the cable 10. Such an arrangement allows easy entry into the cable and access to the fibers for splicing. It is noted that the optical cable 10 of FIGS. 1 and 2 may optionally include additional components such as: (1) a waterblocking tape that surrounds the core tube 120; (2) rip cords; and (3) other kinds of strength members (see e.g., U.S. Pat. No. 5,838,864). However, such components are not shown in FIGS. 1 and 2 because they are not essential to the present invention.

Strength Member Fabrication

Reference is made to FIG. 3, which shows a cross-section view of a strength member according to the present invention. In the preferred embodiment of the invention, dielectric rod 300 provides both tensile and compressive modulus and strength. As discussed above, the compressive properties of rod 300 should only be sufficient to inhibit shrinkage of the plastic jacket and to resist buckling during handling. In preferred embodiments, rod 300 has an overall diameter, $d_3$, of between 1.5 and 3.0 mm (0.06 to 0.12 inches). The interior core 310 of rod 300 primarily comprises filamentary strands of glass and/or ceramic fibers. Electrical grade, continuous-filament glass fibers are used in the preferred embodiment of the invention, and are commercially available from PPG Industries, Inc. or Owens Corning, Inc. A layer 330 of frictional adhesion material encloses the core 310 and provides a predetermined amount of frictional coupling between the rod 300 and the plastic jacket 160 (see FIGS. 1 and 2).

In the preferred embodiment of the invention, the plastic jacket 160 of the cable comprises high density polyethylene, and the coating material 330 is selected to provide a high coefficient of friction with polyethylene jackets. Testing reveals that it is undesirable for the strength rods to adhere too strongly to the plastic jacket. Heretofore an ethylene/acrylic acid copolymer (e.g., Dow Primacor 5990 E-AA) has been used as the coating material for the strength rod, but this makes the cable too stiff because of the lack of axial movement between the strength rod and the jacket. In the present invention, the coated strength rod is allowed to move somewhat with respect to the jacket and reposition itself during handling. Accordingly, coating materials are selected that do not adhesively couple to the jacket—either chemically or physically. In particular, coating materials are selected that frictionally couple to the jacket. Such materials need to be relatively soft (i.e., a hardness that is less than 80 D on the Shore durometer scale, and preferably greater than 35 D). Suitable materials include hot-melt compositions, thermoplastic elastomers, thermally crosslinkable rubbers, or any soft UV-curable, crosslinkable material. In the preferred embodiment of the invention, a thin layer e.g., about 0.025 mm (0.001 inches) or less of a UV-cured polyurethane is applied to the strength rod. A suitable product, designated HVI 2003 Adhesion Promoter, is commercially available from Zeon Technologies—Charlotte, N.C. Testing results of various coatings are shown below in Table I. Note that the adhesion associated with prior-art Ethylene-acrylic acid is substantially and undesirably greater than the adhesion of other coating materials.

The benefit provided by these coatings in blown installations is shown below in Table II. Sharp bends have been included in a prototype duct system in order to simulate an especially difficult installation path. As noted in the table, use of rods whose frictional adhesion to the jacket is between 50 and 300 lb./in$^2$ of rod surface area leads to longer blowing distances. This is believed to be the result of the rods' ability to relax mechanically when the cable is bent out-of-plane. This relaxation allows the rods to take corners in the blowing route more readily.

Tests were conducted in typical summertime weather in the Northeast. The model duct route is 1428 feet, and consists of three 1.25" subducts in a 4" duct. The three subducts are connected together to make a single 4358-foot duct path. The subduct utilized was Dura-Line Corporation Silicore™ smooth-wall subduct, lubricated with Sherman & Reilly Cablejet Lube. This duct run simulates an especially tortuous installation path as it includes thirty 90-degree bends in the horizontal plane. The cable blowing tests were performed using a Sherman & Reilly, Inc. Hydraulic Superjet™. An Ingersoll-Rand P260 (260 cubic feet per minute) air compressor is used for the air supply.

TABLE II

Blowing Installation Simulation Tests

| Cable ID | 3 Loops of 1.25" duct (4358 ft) |
|---|---|
| Prior Art Cable - 216-fiber, Grease-Filled Core, (2 rods/4 rovings) | Distance: 3804 ft Time = 35:02 (mm:ss) Average Velocity: 108.6 feet/min |
| Prior Art Cable - 216-fiber, Dry Core, (2 rods/4 rovings) | Distance: 4074 ft Time = 29:17 (mni:ss) Average Velocity: 139.1 feet/min |
| New Cable - 216-fiber, Dry Core, (2 rods + frictional adhesion layer/0 rovings) | Distance: 4358 ft Time = 23:14 (mm:ss) Average Velocity: 187.6 feet/min |
| New Cable - 216-fiber, Grease-Filled Core, (2 rods + frictional adhesion layer/0 rovings) | Distance: 4358 ft Time = 23:24 (mm:ss) Average Velocity: 186.2 feet/min |

The process for fabricating a strength rod 300 according to the present invention is illustratively outlined by the steps shown in FIG. 4. The first step, designated 41, is for the designer to determine the desired tensile and compressive properties for the rod. In an illustrative embodiment of the invention, a dielectric rod having an overall diameter, $d_3$, of

TABLE I

Adhesion of Dielectric Rods to Plastics
(procedures adapted from ASTM D 1871)

| Rod Diameter | Coating | Plastic | Adhesion, lb. | Adhesion/unit surface area (lb/in$^2$) |
|---|---|---|---|---|
| 0.082" | Ethylene-acrylic acid | HDPE | 282 | 547 |
| 0.107" | Polyester Thermoplastic Elastomer, Shore D Hardness = 47 | HDPE | 52 | 77 |
| 0.107" | Polyester Thermoplastic Elastomer, Shore D Hardness = 40 | HDPE | 61 | 91 |
| 0.107" | UV-Cured Polyurethane | HDPE | 142 | 211 |
| 0.107" | UV-Cured Polyurethane | Low-smoke zero-halogen polyolefin | 132 | 196 | about 2.7 millimeters (0.107 inches) is used. About nineteen (19) packages of electrical grade continuous filament glass fibers are used—each package having an area of about 0.00046 square inches.

In step 42, the packages of glass filamentary strands are impregnated with a thermoset material, which may be cured by thermal treatment or by ultraviolet radiation. Examples of suitable thermoset materials include (i) epoxy resins, and (ii) crosslinked urethane acrylates. In the preferred embodiment of the present invention, a UV-curable epoxy resin is used, which is compatible with filamentary strands of glass fiber.

The packages of glass fibers are then passed through a die to be consolidated into a single rod-like structure and to have excess epoxy removed. The die includes a central hole where the coated glass fibers are inserted, and a plurality of holes (equal to the number of glass packages) surrounding the central hole where the coated glass fibers are inserted. This step is designated 43 in FIG. 4.

Step 44 directs the rod designer to apply tension to the glass fibers. This tension is maintained as the resulting rod is cured by exposure to ultraviolet radiation in step 45.

After the rod cools, it is immersed in a bath of liquid pre-polymer coating material, illustratively HVI 2003 Adhesion Promoter, which is a UV-Curable Polyurethane material as indicated in step 46.

In step 47, excess coating material is removed by passing the coated rod through a die having an predetermined opening, illustratively about 2.7 mm.

Finally, the coated rod is cured by exposure to ultraviolet radiation in step 48.

Each resulting dielectric rod has a tensile stiffness of about 680 pounds/percent of extension for 60–70% by volume glass loading, which is to say that the length of the rod will increase by one percent (1%) when a tensile force of (680 pounds) is applied.

The above described strength rod is preferably installed within an optical cable without helical twisting or a reverse oscillating lay (ROL). Nevertheless, when it is desirable to twist the strength rods along the length of the cable, a smaller diameter rod is recommended.

Prior Art

Figures 5, 6:
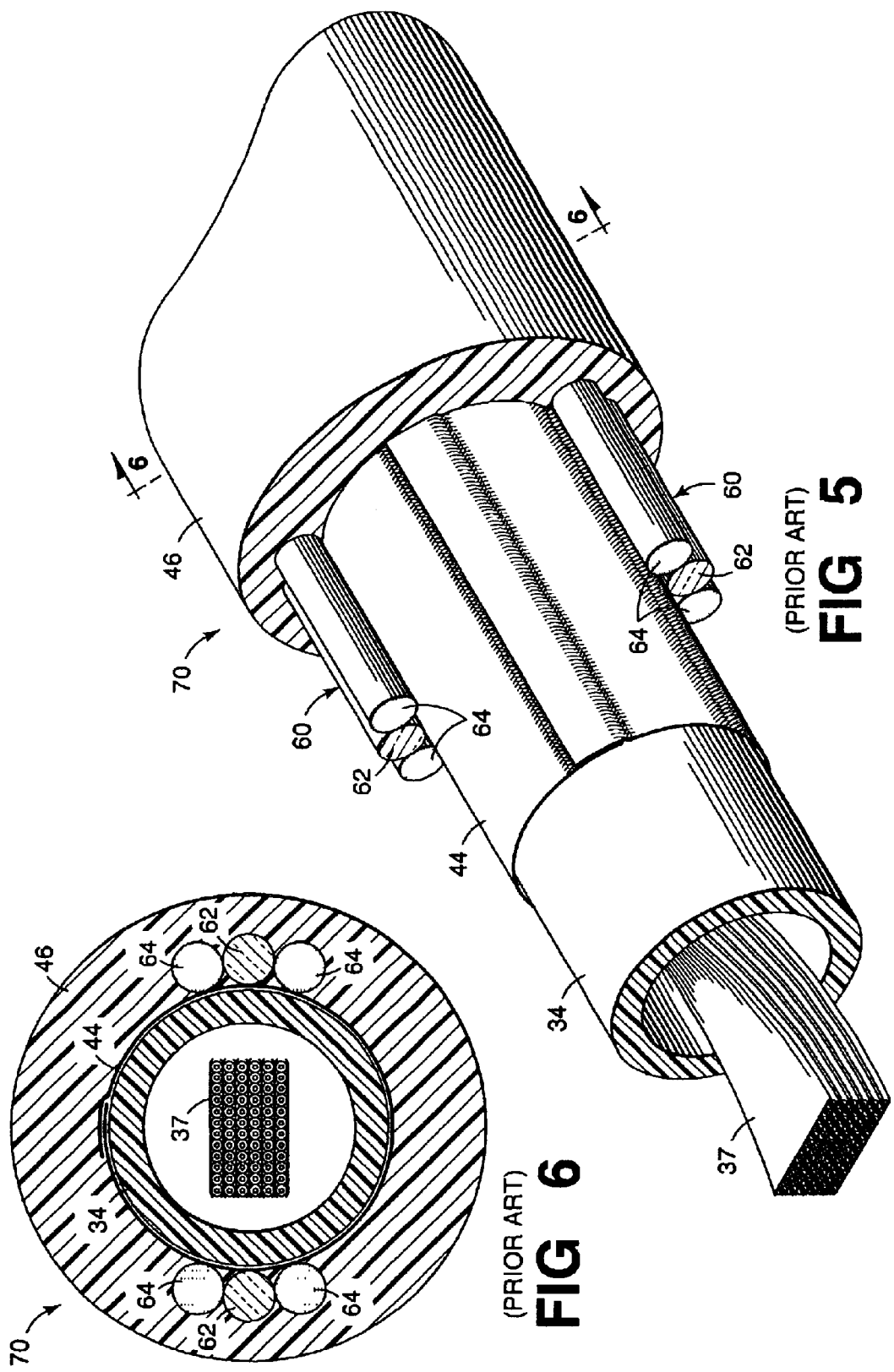
FIG. 5 is a perspective view of a known optical fiber cable.
FIG. 6 is a cross-section view of the cable shown in FIG. 5.

FIGS. 5 and 6 disclose an all-dielectric optical cable, which is disclosed in detail in U.S. Pat. No. 5,109,457. Briefly, this cable is generally designated by the numeral 70 and it includes several ribbon arrays 37 of optical fibers within a plastic core tube 34. A water-absorbing tape 44 surrounds the core tube. However, this tape provides little or no linear strength to the cable. Instead, the strength member system 60 comprises two pluralities of strength members, which are positioned adjacent to the core tube 34, and in engagement with the tape 44. The two pluralities of strength members are diametrically opposed and extend parallel to the longitudinal axis of the cable 70. All of the strength members 62, 64 comprise a substrate which is made of E-glass fiber filaments. However, the substrate of strength members 62 is impregnated with an epoxy material that causes them to become relatively stiff, and renders them capable of withstanding compressive stresses including those which are induced by thermal cycling and initial shrinkage of the jacket material. It is noted that the strength members 62, 64 have a diameter of about 2.0 millimeters (0.08 inches).

Although a particular embodiment has been shown and described, it is understood that various modifications are possible within the scope of the invention. These modifications include, but are not limited to: fabricating the dielectric rods from material(s) other than glass fibers; replacing each diametrically opposed rod with two or more smaller dielectric rods; the use of a small amount of aramid fibers in the strength system, either as rovings or as part of a dielectric rod; and the use of the present invention optical cables having multiple fiber-containing tubes.

What is claimed is:

1. An optical fiber cable having a longitudinal axis, the cable comprising:

at least one plastic tube that extends parallel to the longitudinal axis and encloses a plurality of optical fibers;

a jacket, which is made of a plastic material and which encloses the plastic tube;

a strength member system comprising two diametrically opposed dielectric rods that extend parallel to the longitudinal axis and are at least partially embedded in the jacket, said rods having a compressive stiffness that is effective to inhibit substantial contraction of the cable and a tensile stiffness that is effective to receive a tensile load without substantial transfer of the tensile load to the optical fibers;

wherein each rod is surrounded by a frictional adhesion coating that enables it to move locally within the jacket in response to compressive or flexural stress applied to the cable.

2. The optical fiber cable of claim 1 wherein the diameter of each dielectric rod is between 1.5 and 3.0 millimeters.

3. The cable of claim 1 wherein the dielectric rods primarily comprise filamentary strands of glass fibers that are disposed in a bundle and held together as a unit by a thermoset material.

4. The optical cable of claim 3 wherein the filamentary strands comprise electrical grade, continuous-filament glass fibers.

5. The optical fiber cable of claim 3 wherein the thermoset material comprises an epoxy material.

6. The optical fiber cable of claim 1 wherein the frictional adhesion coating has an adhesion per unit surface area that is between 50 and 300 pounds per square inch.

7. The optical fiber cable of claim 1 wherein the thickness of the jacket adjacent to each rod is 0.76±0.13 millimeters.

8. The optical fiber cable of claim 1 wherein the plastic jacket comprises polyethylene and the frictional adhesion coating material is selected from the group consisting of:

(i) thermoplastic elastomers;

(ii) thermally crosslinkable rubbers;

(iii) UV-curable crosslinkable rubbers; and (iv) a hot-melt composition.

9. The optical fiber cable of claim 8 wherein the frictional adhesion coating has a hardness that is between 35 D and 80 D as measured on the Shore durometer scale.

10. The optical fiber cable of claim 9 wherein the frictional adhesion coating comprises polyurethane.

11. The optical fiber cable of claim 9 wherein the frictional adhesion coating comprises a polyester elastomer.

12. The optical cable of claim 1 wherein the outer surface of the jacket is textured to increase its surface area.

13. The optical fiber cable of claim 1 wherein the tubular member has a longitudinal axis that is collinear with the longitudinal axis of the cable.

14. An optical fiber cable having a longitudinal axis comprising:

a tubular member containing a plurality of optical fibers;

a jacket, which is made of a plastic material and which encloses the tubular member; and a dielectric strength member system, which is held adjacent to the tubular member by the jacket and which is substantially embedded in the jacket, said strength member system comprising two diametrically opposed linear members extending parallel to a longitudinal axis of the cable and being coupled to the jacket, each strength member comprising a core of continuous-filament glass fibers that are embedded in a thermoset material and surrounded by a frictional adhesion coating having any adhesion per unit surface area that is between 50 and 300 pounds per square inch.

15. The optical fiber cable of claim 14 wherein the jacket comprises polyethylene and the coating material comprises polyurethane.

16. The optical fiber cable of claim 14 wherein the outside surface of the jacket is textured, thereby enhancing the ability of the cable to be blown through a duct.

17. The optical fiber cable of claim 14 wherein the tubular member has a longitudinal axis that is collinear with the longitudinal axis of the cable.

* * * * *